United States Patent
Khodakovsky et al.

(10) Patent No.: US 7,098,916 B1
(45) Date of Patent: Aug. 29, 2006

(54) CONNECTIVITY ENCODING AND DECODING OF POLYGON MESHES

(75) Inventors: Andrei Khodakovsky, Pasadena, CA (US); Peter Schroeder, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 348 days.

(21) Appl. No.: 10/252,019

(22) Filed: Sep. 19, 2002

Related U.S. Application Data

(60) Provisional application No. 60/323,691, filed on Sep. 20, 2001.

(51) Int. Cl.
*G06F 17/00* (2006.01)
*G06T 1/00* (2006.01)
*G06T 15/00* (2006.01)
*G06T 17/00* (2006.01)
*G06K 9/36* (2006.01)
*G06K 9/46* (2006.01)
*G06K 9/48* (2006.01)

(52) U.S. Cl. ............... 345/428; 345/419; 345/418; 382/232; 382/241

(58) Field of Classification Search ........... 382/232; 345/421, 428
See application file for complete search history.

(56) References Cited

OTHER PUBLICATIONS

Isenburg, M. and J. Snoeyink. "Face fixer: compressing polygon meshes with properties." Int. Conf. on Comp. Graphics and Inter. Techniques. Siggraph 2000, pp. 263-270. ☐☐ISBN:1-58113-208-5.*

Alliez, P. and M. Desbrun. "Progressive compression for lossless transmission of triangle meshes". Proc. 28th Annual Conf. on Comp. Graph. and Int. Tech. (SIGCHI). 2001, pp. 195-202, ISBN: 1-58113-374-X.*

Alliez, P. and Desbrun, M., *Valence-Driven Connectivity Encoding of 3D Meshes*, Eurographics 2001 Conference Proceedings, Sep. 2001, pp. 480-489.

Bar-Yehuda, R. and Gotsman, C., *Time/Space Tradeoffs for Polygon Mesh Rendering*, ACM Transactions on Graphics 15 (2), Apr. 1996, pp. 141-152.

Chow, M., *Optimized Geometry Compression for Real-Time Rendering*, IEEE Visualization 97 Conference Proceedings, 1997, pp. 347-354.

Chuang, R. C.-N., et al., *Compact Encodings of Planar Graphs via Canonical Orderings and Multiple Parentheses*, Automata, Languages and Programming, 1998, pp. 118-129.

(Continued)

*Primary Examiner*—Ulka Chauhan
*Assistant Examiner*—Eric Woods
(74) *Attorney, Agent, or Firm*—Howrey LLP

(57) ABSTRACT

Methods of connectivity encoding polygonal mesh representations of objects are described, along with methods of decoding encoded connectivity information for polygonal mesh representations of objects. In the encoding process, an active vertex queue is initialized with one or more vertices incident to a seed face. A vertex is selected from the queue, and the ring of the vertex traversed. If an unprocessed face is encountered during the traversal, the degree of the face, and the valences of any unprocessed vertices incident to the face are output. Any such unprocessed vertices are also entered into the queue. The method iterates until no more vertices remain on the active queue. In one implementation, an encoded data stream is output, which comprises two logical streams, one for face-degree information and the other for vertex-valence information. In the decoding process, the encoded data stream is received, and the connectivity of the mesh regenerated.

14 Claims, 17 Drawing Sheets

OTHER PUBLICATIONS

Deering, M., *Geometry Compression*, ACM SIGGRAPH 98 Conference Proceedings, 1995, pp. 13-20.

Gumhold, S. *New Bounds on the Encoding of Planar Triangulations*, Tech. Rep. WSI-2000-1, Wilhelm Schickard Institute for Computer Science, Tübingen, Mar. 2000.

Gumhold, S. and Strasser, W., *Real Time Compression of Triangle Mesh Connectivity*, SIGGRAPH 98 Conference Proceedings, 1998, pp. 133-140.

Isenburg, M., *Compression Polygon Mesh Connectivity with Degree Duality Prediction*, Graphics Interface, May 2002.

Isenburg, M. and Snoeyink, J., *Spirale Reversi: Reverse Decoding of the Edgebreaker Encoding*, 12$^{th}$ Canadian Conference on Computational Geometry, 2000, 247-256.

Isenburg, M. and Snoeyink, J., *Face Fixer: Compressing Polygon Meshes With Properties*, ACM SIGGRAPH 2000 Conference Proceedings, 2000, pp. 263-270.

Keeler, K. and Westbrook, J., *Short Encodings of Planar Graphs and Maps*, Aug. 3, 1993, *reprinted in* DAMATH: Discrete Applied Mathematics and Combinatorial Operations Research and Computer Science 58, 1995.

King, D. and Rossignac, J., *Guaranteed 3.67V bit Encoding of Planar Triangle Graphs*, 11$^{th}$ Canadian Conference on Computational Geometry, 1999, 146-149.

King, D. et al., *Connectivity Compression for Irregular Quadrilateral Meshes*, GVU Tech. Rep. GVU-GIT-99-36, Georgia Tech, Nov. 19, 1999, revised Mar. 31, 2000.

Kronrod, B. and Gotsman, C., *Efficient Coding of Non-Triangular Mesh Connectivity*, Graphical Models 63, 2001, pp. 263-275.

Li, J., Kuo, C.-C.J. and Chen, H., *Mesh Connectivity Coding by Dual Graph Approach*, ISO/IEC JTC1/SC29/WG11 Coding of Moving Pictures and Audio, MPEG98/m3530, Mar. 1998.

Rossignac, J., *Edgebreaker: Connectivity Compression for Triangle Meshes*, IEEE Transactions on Visualization and Computer Graphics, 1999, pp. 47-61.

Rossignac, J. et al., *3D Compression Made Simple: Edgebreaker on a Corner-Table*, Invited Lecture at the Sharpe Modeling Intl Conference, Gemoa, Italy, Jan. 30, 2001, pp. 1-6.

Rossignac, J. and Szymczak, A., *Wrap&Zip Decompression of the Connectivity of Triangle Meshes Compressed with Edgebreaker*, Journal of Computational Geometry, Theory and Applications 14, Nov. 1999, pp. 119-135.

Szymczak, A. et al., *An Edgebreaker-based Efficient Compression Scheme for Regular Meshes*, 12$^{th}$ Canadian Conference on Computational Geometry, 2000, pp. 257-265.

Taubin, G. et al., *Geometry Coding and VRML*, Proceedings of the IEEE 96(6), 1998, pp. 1228-1243.

Taubin, G. and Rossignac, J., *Geometric Compression Through Topilogical Surgery*, ACM Transactions on Graphics 17(2), Apr. 1998, pp. 84-115.

Touma, C. and Gotsman, C., *Triangular Mesh Compression*, Graphics Interface 98 Conference Proceedings, Jun. 1998, pp. 26-34.

Turan, G., *Succinct Representations of Graphs*, Discrete Applied Mathematics 8, 1984, pp. 289-294.

Tutte, W., *A Census of Planar Triangulations*, Canadian Journal of Mathematics 14, 1962, pp. 21-38.

Tutte, W., *A Census of Planar Maps*, Canadian Journal of Mathematics 15, 1963, 249-271.

* cited by examiner

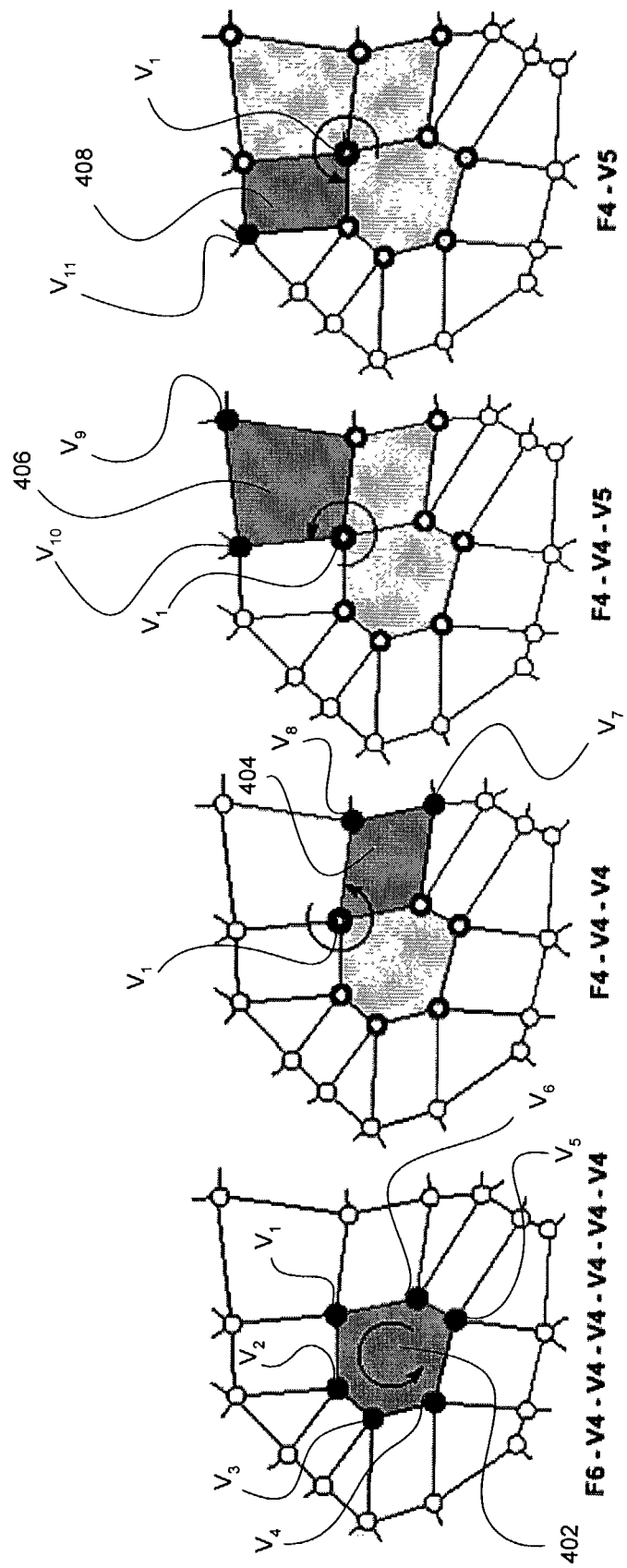

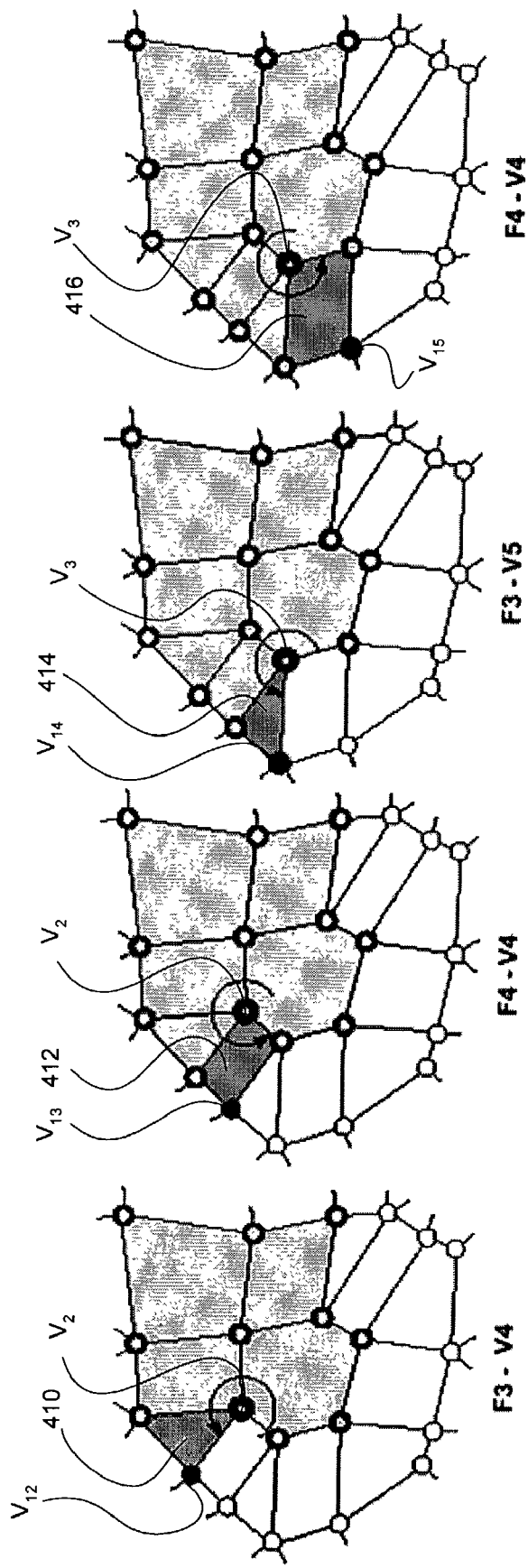

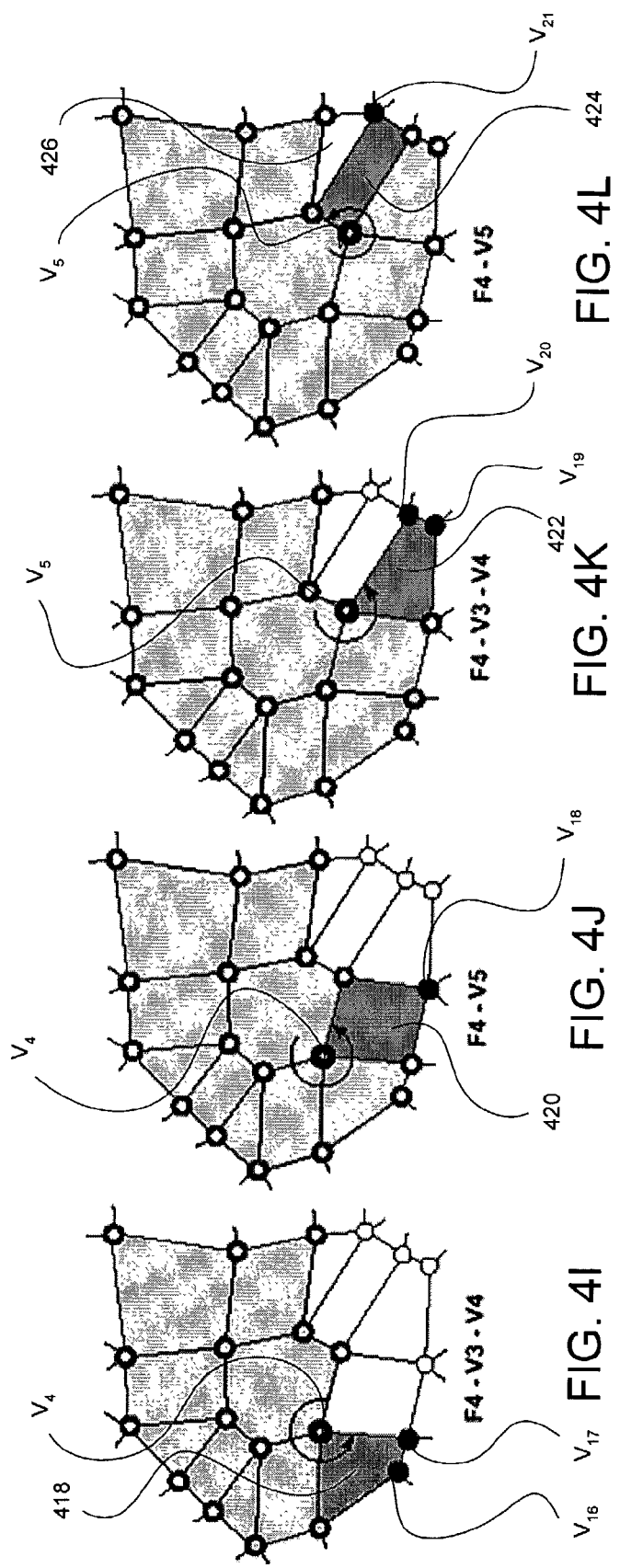

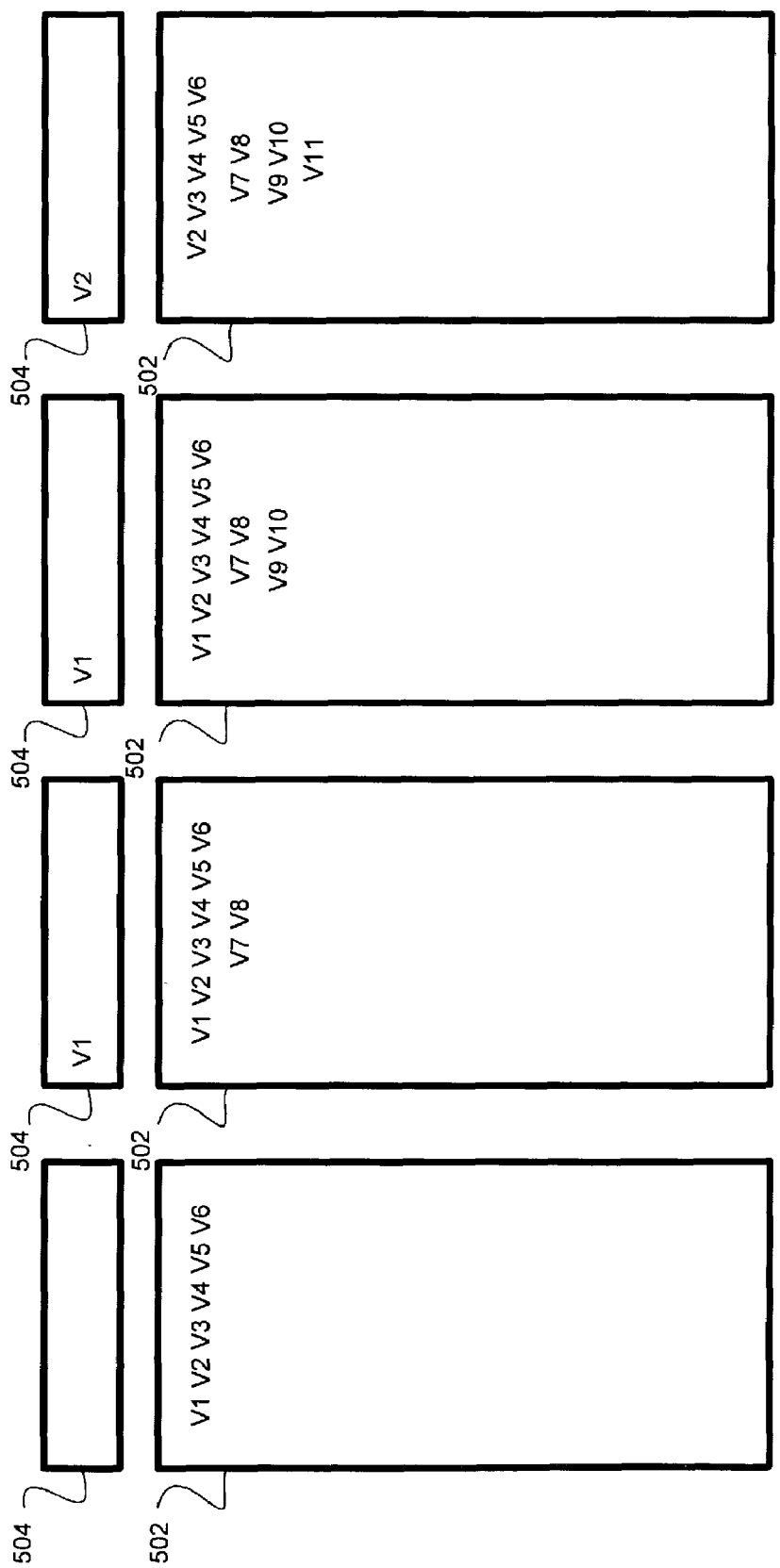

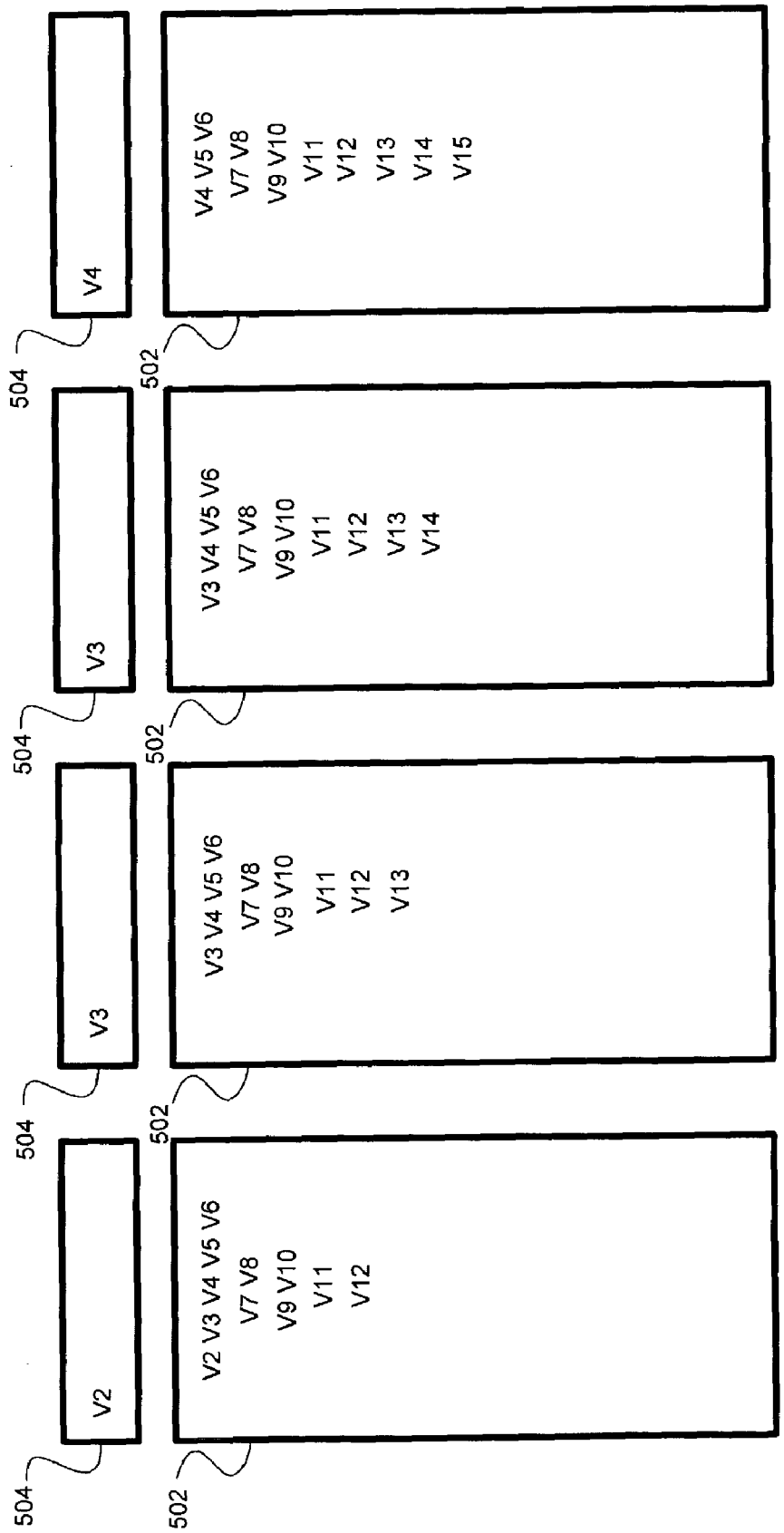

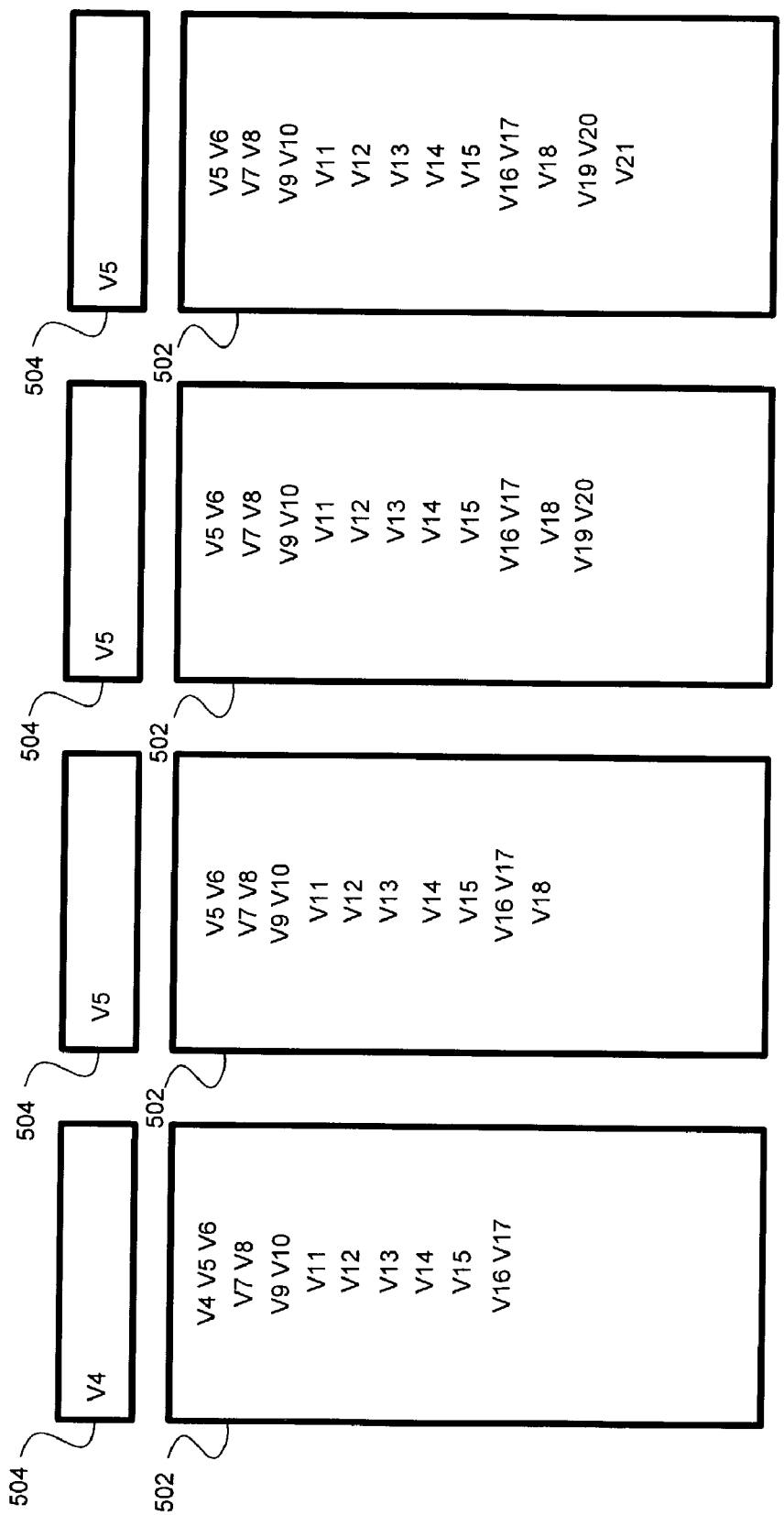

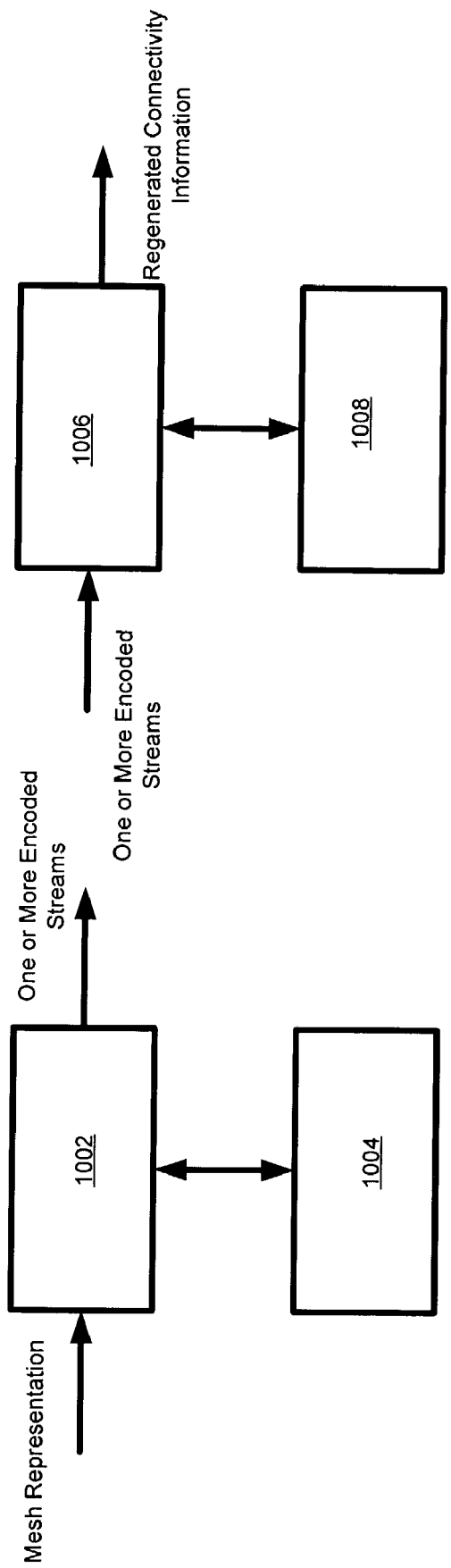

In the following pseudo-code we use a Face class and a Vertex class such as each face has access to its degree and to an array of its vertices, and each vertex has access to its valence and an array of its adjacent faces. We further assume that any access to a vertex (resp., face) array is done *modulo* the degree (resp., the valence), to avoid unnecessary index testing. "ActiveSet" is a container for all active vertices. Finally, the following functions have to be implemented in the decoder and the encoder to perform actual I/O operations (read for the decoder, write for the encoder):

| | |
|---|---|
| Face* *ioFace* (v, j) | – i/o a degree. Returns a face |
| Face* *ioFaceInit* () | – likewise, but just to bootstrap. Returns 0 if Done |
| Vertex* *ioVertex* (f,i) | – i/o a valence or a Split code. Returns Vertex or 0 (if split) |
| int *ioSplitVertex* (f,i) | – i/o a vertex index in ActiveSet, |
| int *ioSplitPos* (f,i); | – i/o a face position in a vertex array |

```
// Entry point
void run ( ) {
    while ( runComponent ( ) ! = Done ) ;
}
```

FIGURE 11A

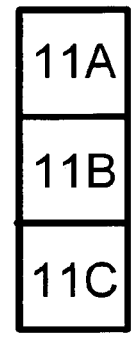

```
// Process one connected component
Result runComponent ( ) {
    if ( ! init () ) return Done;
    while ( v=ActiveSet.next () ) {
        completeV (v);
        ActiveSet.remove (v);
    }
    return Continue;
}

// Initialization, returns false if the whole mesh is processed
bool init ( ) {
    if ( ! f = ioFaceInit () )
        return false;         // all faces are processed
    for ( i = 0 ; i < f.degree ; i++ )
        activateV (f, i);     // process all vertices
    return true;
}

// Completes processing of the current vertex.
// in: v has valid valence and v.f[0] fields
// out: all fields of v are valid
void completeV ( v ) {
    while ( j = v.firstEmpty () ) {     // while there is an empty slot
        f = activateF (v, j);            // create a face
        completeF (f, j);                // process its vertices
    }
}

// Consistency of a face-vertex state ("FV") means: ∀ i: f.v[i] == v ⟹ ∃ j: v.f[j] == f
// "Linked edge" consistency means:
// ∀ j: (v.f[j] ! = 0 && v.f[j-1] ! = 0) ⟹ ∃ i1, i2: v.f[j].v[i1+1] == v.f[j-1].v[i2-1]

// Create a vertex
// in: a face and vertex's position i
// out: an active vertex (valence and v.f[0] are valid), f is "FV" consistent with v
void activateV ( f, i ) {
    v = ioVertex (f, i);        // i/o valence (creates a vertex) or Split
    if ( v ) {                   // if a new active vertex
        f.v[i] = v; v.f[0] = f;
        ActiveSet.add (v);
    } else {                     // vertex already exists: Split
        v = ioSplitVertex (f, i);    // i/o v's index in ActiveSet, returns v
        j = ioSplitPos (f, i);       // i/o position of f in v
        f.v[i] = v;
        addFaceToVertex (f, i, v, j);
    }
    return v;
}
```

FIGURE 11B

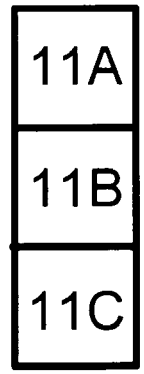

```
// Creates a face
// in: vertex v and face's position j
// out: active face (degree and f.v[0] are valid), f is "FV" consistent with v
void activateF ( v, j ) {
    f = ioFace (v,j);        // i/o degree, create face
    f.v[0] = v;
    addFaceToVertex (f, 0, v, j);
}

// Processes all vertices of a face f
// in: an active face f (degree and f.v[0] are valid), and face's position j > 0, (v.f[j-1]! = 0)
// out: all fields of f are valid, "FV" is enforced
void completeF ( f, j ) {
    vp = f.v[0]; jp = j; i = 1;
    while ( vn = f.v[i] ) {          // forces "FV" in "next" direction
        jn = vn.find( vp.f[jp-1] )-1;
        vn.addFaceToVertex (f, i, vn, jn);
        vp = vn; jp = jn; i++;
        if ( i >= f.degree ) return ;
    }
    ilast = i;
    vp = f.v[0]; jp = j; i = f.degree -1;
    while ( vn = f.v[i] ) {          // forces "FV" in "prev" direction
        jn = vn.find( vp.f[jp+1] )+1;
        addFaceToVertex (f, i, vn, jn);
        vp = vn; jp = jn; i--;
        if ( i <= ilast ) return ;
    }
    for ( ; ilast < i; ilast++ )      // process unresolved vertices
        activateV (f,ilast);
}

// Adds face f to a vertex v
// in: face f and vertex v, f.v[i] == v, an index j
// out:v.f[j] ==f, "link edge" is enforced on v
void addFaceToVertex ( f, i, v, j ) {
    v.f[j] = f;            // add a face
    if ( fp = v.f[j-1] ) {         // if prev face exist "link edge"
        ip = fp.find (v);
        if ( ! f.v[i+1] )
            f.v[i+1] = fp.v[ip-1];
    }
    if ( fn = v.f[j+1] ) {         // if next face exist "link edge"
        in = fn.find (v);
        if ( ! f.v[i-1] )
            f.v[i-1] = fn.v[in+1];
    }
}
```

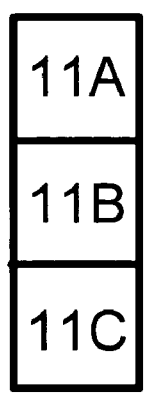

FIGURE 11C

CONNECTIVITY ENCODING AND DECODING OF POLYGON MESHES

This application claims the benefit of U.S. Provisional Application No. 60/323,691, filed Sep. 20, 2001, which is hereby fully incorporated by reference herein as though set forth in full.

The U.S. Government has certain rights in this invention pursuant to Grant Numbers ACI-9721349 and ACI-9982273 awarded by the National Science Foundation.

1. Field of the Invention

This invention relates to the field of encoding and decoding representations of object surfaces in the form of polygon meshes, and, more specifically, to connectivity encoding and decoding of polygon meshes.

2. Related Art

A mesh structure is a convenient way to represent object surfaces. In a mesh structure, a mesh of tessellated polygons, such as triangles, quads, octagons, etc., or combinations thereof, is used to represent the object surface. The vertices of the polygons are positioned on the object surface, and the flat polygon faces represent the object surface. Unless the object surface is flat, the flat polygon surfaces form an approximation of the object surface. The level of accuracy of the representation depends on the number of polygons in the mesh representation. Generally speaking, the more polygons in the mesh, the more accurate the mesh representation. Some examples of mesh representations are illustrated in FIGS. 1A–1B. FIG. 1A is a mesh representation of a bust of Beethoven; and FIG. 1B is a mesh representation of a galleon.

Connectivity encoding algorithms are algorithms for encoding the connectivity of a mesh representation into a compressed form, so that the underlying information can be stored or transmitted with fewer bits than the uncompressed mesh representation. These include specialized algorithms which only work with mesh representations formed of triangles, and generalized algorithms which work with other types of polygons. An example of a specialized program which can only be used with triangle representations is described in C. Touma & C. Gotsman, "Triangle Mesh Compression, "Graphics Interface 98 Conference Proceedings (June 1998), pp. 26–34. An example of a generalized program known as Face Fixer is described in M. Isenburg & J. Snoeyink, "Face Fixer: Compressing Polygon Meshes With Properties," ACM SIGGRAPH 2000 Conference Proceedings (2000), pp. 263–270.

An advantage of the specialized programs over the generalized algorithms is that the specialized algorithms typically exhibit a substantially greater compression ratio, e.g., 20% or more, compared to the specialized programs for the class of polygon meshes for which they are suited, such as polygon meshes composed of triangles. On the other hand, a disadvantage of the specialized programs is that they can be utilized only with a specific, limited class of polygon meshes.

Thus, there is a need for a generalized program which exhibits the greater compression ratios characteristic of the specialized programs.

SUMMARY

A method of connectivity encoding a polygonal mesh representation of an object is described. In one embodiment, the method begins by initializing an active queue with one or more unprocessed vertices from the polygonal mesh representation. In one implementation, these vertices are incident to a selected seed face. This queue keeps track of those vertices which have yet to be processed.

Then, a vertex is selected from the active queue. The ring of the vertex is then traversed. The ring of the vertex is an ordered list of faces which are incident to the vertex.

For each unprocessed face encountered during this traversal, the degree of the face is output along with the valence of any unprocessed vertices incident to the face. Any such unprocessed vertices are also entered into the active queue.

When the traversal has been completed, the selected vertex is removed from the active queue. If any vertices remain on the active queue, one of the vertices is selected and another iteration of the method performed. The method continues to iterate until no vertices remain on the active queue.

A method of decoding encoded connectivity information for a polygonal mesh representation of an object is also described. In one embodiment, the method begins by reading input data representative of the connectivity of one or more vertices of the mesh representation, and initializing an active queue with the one or more vertices. In one implementation, the one or more vertices are incident to a seed face.

Next, a vertex is selected from the active queue. Input data representative of the connectivity of any unprocessed faces incident to the vertex, and any unprocessed vertices incident to the faces, is read and used to regenerate the connectivity of the ring of the vertex. The ring of the vertex is an ordered set of all faces which are incident to the vertex. Each of the unprocessed vertices is also added to the active queue.

When the connectivity of the ring has been regenerated, the selected vertex is removed from the active queue. If any vertices remain on the active queue, one of the vertices is selected, and another iteration of the method performed. The method continues to iterate until no vertices remain on the active queue.

Related systems, encoders, decoders, memories, data structures, and methods are also described. It is intended that all such systems, encoders, decoders, memories, data structures, and methods be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 4A–4L illustrate representative stages in the process of connectivity encoding a mesh representation.

FIGS. 5A–5L illustrate representative stages of the active vertex queue during the process of connectivity encoding a mesh representation.

FIG. 10A is a block diagram of an embodiment of an encoding system according to the invention, and FIG. 10B is a block diagram of an embodiment of a decoding system according to the invention.

FIGS. 11A–11C is pseudo-code embodying one implementation of a method of connectivity encoding and decoding a polygonal mesh representation of an object.

DETAILED DESCRIPTION

As utilized herein, terms such as "about" and "substantially" are intended to allow some leeway in mathematical exactness to account for tolerances that are acceptable in the trade. Therefore, any deviation upward or downward from the value modified by "about" or "substantially" by any value in the range of 1% to 20% of such value is explicitly within the scope of the modified value. Moreover, as used herein, the terms "face" and "polygon" are synonyms and are used interchangeably.

As used herein, the term "software" includes source code, assembly language code, binary code, firmware, macro-instructions, micro-instructions, or the like, or any combination of two or more of the foregoing.

The terms "processor" or "CPU" or "computer" refer to any device capable of executing a series of instructions and includes, without limitation, a general- or special-purpose microprocessor, finite state machine, controller, computer, digital signal processor (DSP), or the like.

Furthermore, the term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, on which may be stored a series of software instructions executable by a processor.

The term "logic" means any implementation, including software, hardware, and combinations of hardware and software. The term "queue" means a list maintained in any order, including but not limited to a first-in-first-out order.

Figure 1B:
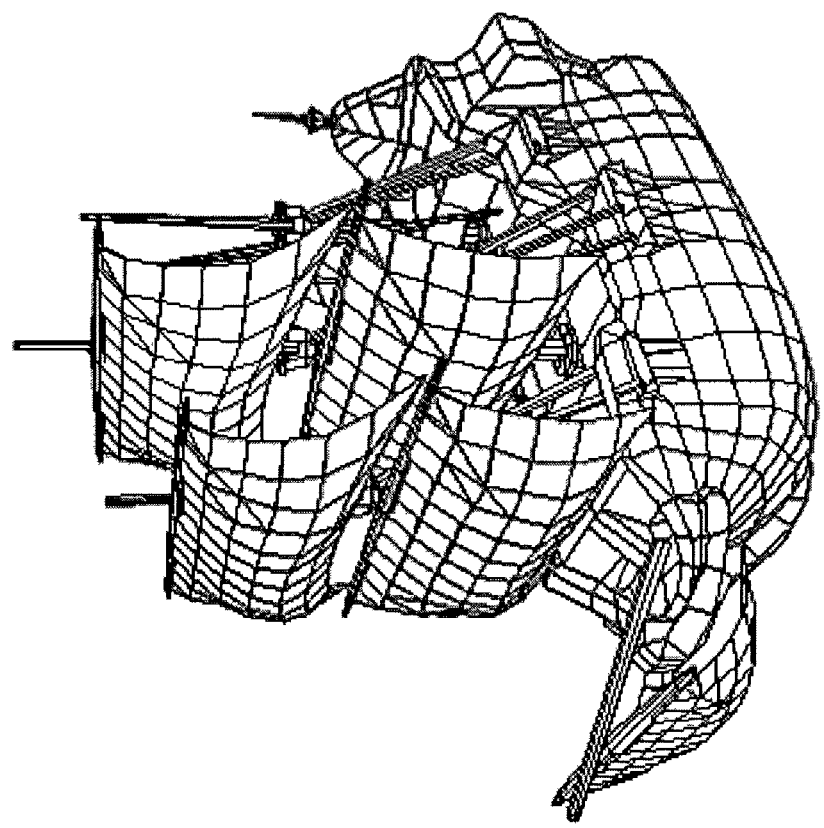
FIGS. 1A and 1B illustrate examples of polygonal mesh representations.
Figure 1A:
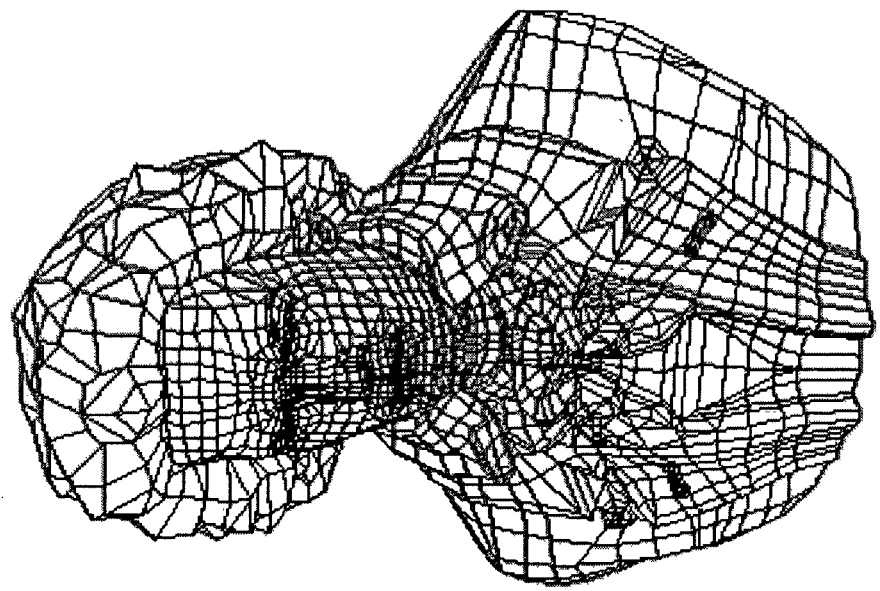
Figure 2:
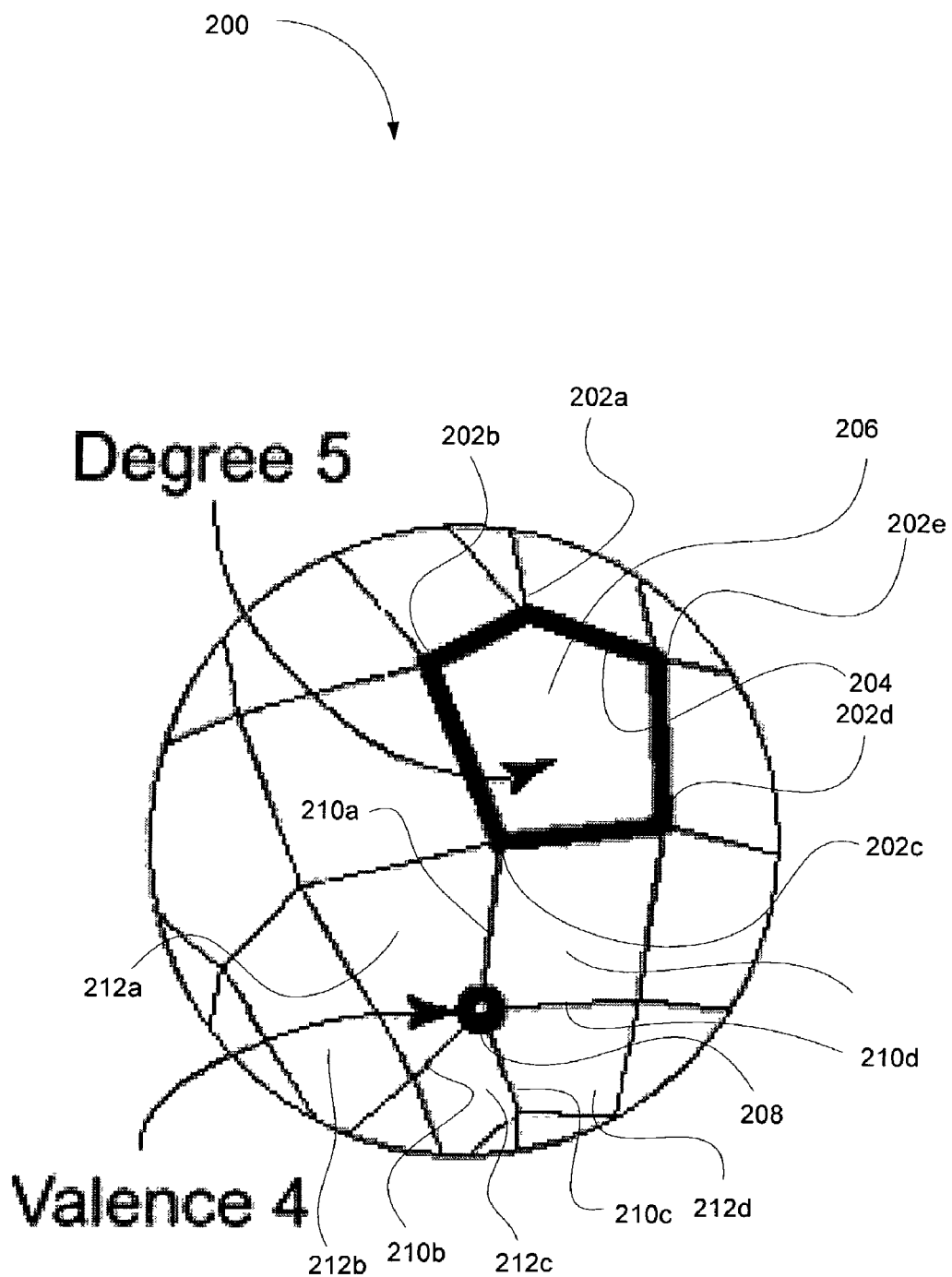
FIG. 2 illustrates various topologic elements associated with a polygonal mesh representation, including vertices, edges, and faces, and various attributes of these elements, such as the valence and ring of a vertex, and the degree of a face.

The specification of a mesh generally consists of topologic elements, such as vertices, faces, and edges, and attributes thereof, such as vertex positions, face colors, etc. FIG. 2 respectively illustrates a vertex 202a, an edge 204, and a face 206 of a portion 200 of a polygonal mesh. The "connectivity" of a mesh describes the incidences between the topologic elements, and is implied by the topology. For example, two vertices or faces are adjacent if there is an edge which is incident to both.

The number of edges incident to a vertex is its "valence." Thus, in FIG. 2, the valence of vertex 208 is four, since there are four edges, identified respectively with numerals 210a, 210b, 210c, and 210d, incident to the vertex. The number of edges incident to a face is its "degree." Thus, in FIG. 2, the valence of face 206 is five, since there are five edges, identified respectively with numerals 202a, 202b, 202c, 202d, and 202e, incident to the face. The "ring" of a vertex is an ordered list of all its incident faces. In FIG. 2, the ring of vertex 208 is the ordered list of faces 212a, 212b, 212b, 212c, and 212d.

Figure 3:
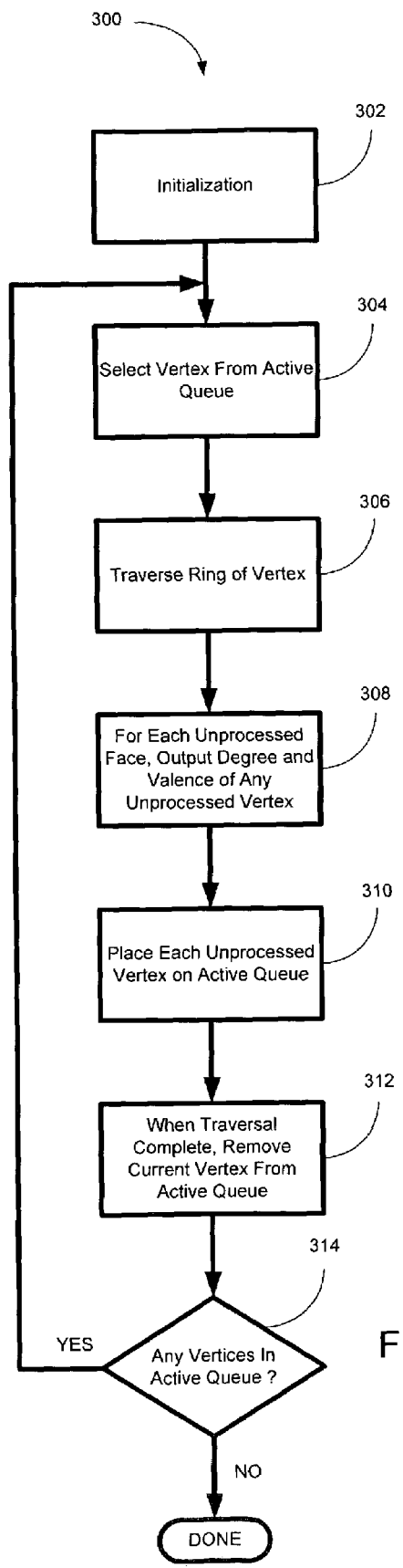
FIG. 3 is a flow diagram illustrating an embodiment of a method of connectivity encoding a mesh representation of an object.

FIG. 3 is a flow diagram illustrating one embodiment 300 of a method of connectivity encoding a polygonal mesh representation of an object. In this embodiment, the conditions on the mesh representation are that: (1) the mesh is a manifold, meaning that only two faces share each edge of the mesh representation and every vertex should only have one ring of faces; and (2) the manifold is orientable. Otherwise, the degree of each of the faces can be any arbitrary number of three of more, and need not be uniform. Similarly, the valence of each of the vertices can be any arbitrary number of two or more, and need not be uniform.

As illustrated, in this particular embodiment, the method begins with initialization step 302. In this initialization step, a queue, which may be referred to as the active vertex queue or active queue, is initialized with one or more vertices which have not yet been processed. In one implementation, this step occurs by selecting a seed face, and then outputting in the encoded data stream the degree of the face, and, in a prescribed order, the valence of each the vertices which are incident to the seed face. In addition, each of the vertices incident to the seed face is added to the active queue.

A mesh may represent multiple, connected components which are not attached to one another topologically. In one embodiment, if the mesh represents multiple, connected components, during initialization, one of the components is selected for initial processing, with the processing of the remaining components deferred to subsequent iterations of the method.

The mesh is allowed to have boundaries. A boundary consists of edges which do not have two incident faces, and thus violates the requirement that the mesh be a manifold. To satisfy the requirement that the mesh be a manifold, the mesh is "closed" by adding dummy faces to the boundary.

These dummy faces are encoded the same as regular faces, except that a symbol or other identifying indicia is output so that the decoder can distinguish dummy faces from regular faces, and discard the dummy faces at the end of the decoding process.

Step 304 follows step 302. In step 304, a vertex is selected from the active queue. In one implementation, this vertex is referred to as the current vertex. In one example, the vertex which is selected is the vertex which has been on the active queue the longest. As will be observed, this procedure implements a first-in-first-out policy. However, it should be appreciated that other methods of selection are possible. In one example, a heuristic is applied to select a vertex. The heuristic is designed to minimize occurrences of a split vertex, to be discussed farther on, because of the added expense of processing split vertices.

According to this heuristic, vertices from the active queue are selected, during the encoding process, in an order which is inversely proportional to the "incompleteness" of the vertex. The "incompleteness" of a vertex is the number of unprocessed faces incident to the vertex. Through this approach, priority is given to vertices having "almost complete" rings. Such rings are usually located in concave sections at the boundary between processed and unprocessed parts of the mesh. Empirically, these areas are the main source of split vertices. Hence, the heuristic tends to avoid formation of such regions, thereby decreasing the number of splits. To ensure synchronization or at least symmetry between the encoder and decoder, in one embodiment, the same heuristic is followed at the decoder.

Step 306 follows step 304. In step 306, the ring of the selected vertex is traversed in a prescribed order. In one example, the order which is followed is the counterclockwise order, but it should be appreciated that other examples are possible. If any unprocessed faces are encountered during this traversal, step 308 is performed. In step 308, the degree of the face is output in the encoded data stream, and the vertices incident to the face are traversed in the prescribed order. If any unprocessed vertices are encountered during this traversal, the valence of such vertices are output in the encoded data stream in the order in which they are traversed.

From step 308, the method proceeds to step 310. In step 310, any unprocessed vertex encountered in the previous step is placed on the active queue.

When the traversal step 306 is complete, step 312 is performed. In step 312, the current vertex is removed from the active queue, signifying that this vertex has been processed.

Step 314 follows step 312. In step 314, an inquiry is made whether there any vertices remaining on the active queue. If so, the method loops back to step 304 for another iteration. If not, the method completes.

If additional mesh components remain to be processed, in one embodiment, the method iterates, beginning with initialization step 302, for each of the remaining components.

To explain this process in more detail, please refer to FIGS. 4A–4L, which illustrates various stages during the process of connectivity encoding a particular example of a mesh representation, and FIGS. 5A–5L, which illustrate corresponding stages of the active queue.

In FIG. 4A, initialization is accomplished. In one implementation, seed face 402 is selected, and the degree of this face, six, is output in the encoding data stream. This particular output is represented at the bottom of the figure with the symbol F6. The vertices thereof are also traversed in a prescribed order. In this particular example, the vertices are traversed in the counter-clockwise order, but it should be appreciated that other examples are possible.

As the vertices are traversed, the valences thereof are output in the encoding data stream. In this particular example, there are six vertices each with a valence of four. The output for these six vertices is represented at the bottom of the figure by the six renderings of the symbol V4.

Since the six vertices incident to the seed face 402 have not yet been processed, they are all added to the active queue. Referring to these six vertices as $V_1$, $V_2$, $V_3$, $V_4$, $V_5$, and $V_6$, respectively, the situation is as shown in FIG. 5A. There, the active queue is identified with numeral 502. As shown, these six vertices have been placed in this queue. (Numeral 504 in FIG. 5A identifies the current vertex, an element which will be explained later).

Next, the vertex $V_1$ is selected as the current vertex. The ring of this vertex is then traversed. The traversal of the unprocessed faces incident to vertex $V_1$ is illustrated in FIGS. 4B, 4C, and 4D. In FIG. 4B, face 404 is encountered. In FIG. 4C, face 406 is encountered. In FIG. 4D, face 408 is encountered. Since each of these faces is unprocessed, steps 308 and 310 are performed in relation to each of these faces.

In particular, as illustrated in FIG. 4B, the degree of face 404, four, is output in the encoded data stream, followed by the valences of the two unprocessed vertices incident to face 404, $V_7$ and $V_8$. These two vertices each have a valence of four. The combined output for the face 404, and the vertices $V_7$ and $V_8$, consists, as indicated at the bottom of the figure, of the symbol F4, followed by two renderings of the symbol V4.

The two vertices $V_7$ and $V_8$ are also placed on the active queue. The situation is as illustrated in FIG. 5B. Again, numeral 504 identifies the current vertex, in this case $V_1$, and numeral 502 identifies the contents of the active queue.

Next, as illustrated in FIG. 4C, the degree of face 406, four, is output in the encoded data stream, followed by the valences of the two unprocessed vertices incident to face 406, $V_9$ and $V_{10}$. Vertex $V_9$ has a valence of four, while vertex $V_{10}$ has a valence of five. The combined output for the face 406, and the vertices $V_9$ and $V_{10}$, consists, as indicated at the bottom of the figure, of the symbol F4, followed by the symbol V4, and then the symbol V5.

The two vertices $V_9$ and $V_{10}$ are also placed on the active queue. Similarly, the vertex $V_1$ continues to be designated as the current vertex. The situation is as illustrated in FIG. 5C.

Next, as illustrated in FIG. 4D, the degree of face 408, four, is output in the encoded data stream, followed by the valence of the one unprocessed vertex incident to face 408, $V_{11}$. Vertex $V_{11}$ has a valence of five. The combined output for the face 408, and the vertex $V_{11}$, consists, as indicated at the bottom of the figure, of the symbol F4, followed by the symbol V5.

The vertex $V_{11}$ is also placed on the active queue. Moreover, since the traversal is complete, the vertex $V_1$ is removed from the active queue, and another vertex, $V_2$, designated as the current vertex. The situation is as illustrated in FIG. 5D.

The ring of vertex $V_2$ is then traversed. This process is illustrated in FIGS. 4E and 4F. In FIG. 4E, face 410 is encountered. In FIG. 4F, face 412 is encountered. Since each of these faces is assumed to be unprocessed, steps 308 and 310 are performed in relation to each of these faces.

In particular, as illustrated in FIG. 4E, the degree of face 410, three, is output in the encoded data stream, followed by the valence of the one unprocessed vertex incident to face 410, $V_{12}$. This vertex has a valence of four. The combined output for the face 410, and the vertex $V_{12}$, consists, as indicated at the bottom of the figure, of the symbol F3 followed the symbol V4.

The vertex $V_{12}$ is also placed on the active queue. The situation is as illustrated in FIG. 5E. Again, numeral 504 identifies the current vertex, in this case $V_2$, and numeral 502 identifies the contents of the active queue.

Next, as illustrated in FIG. 4F, the degree of face 412, four, is output in the encoded data stream, followed by the valence of the one unprocessed vertex incident to face 412, $V_{13}$. Vertex $V_{13}$ has a valence of four. The combined output for the face 412, and the vertex $V_{13}$, consists, as indicated at the bottom of the figure, of the symbol F4, followed by the symbol V4.

The vertex $V_{13}$ is also placed on the active queue. Similarly, since the traversal of vertex $V_2$ is complete, vertex $V_2$ is removed from the active queue, and another vertex, vertex $V_3$, is designated as the current vertex. The situation is as illustrated in FIG. 5F.

The ring of vertex $V_3$ is then traversed. This process is illustrated in FIGS. 4G and 4H. In FIG. 4G, face 414 is encountered. In FIG. 4H, face 416 is encountered. Since each of these faces is assumed to be unprocessed, steps 308 and 310 are performed in relation to each of these faces.

Next, as illustrated in FIG. 4G, the degree of face 414, three, is output in the encoded data stream, followed by the valence of the one unprocessed vertex incident to face 414, $V_{14}$. Vertex $V_{14}$ has a valence of five. The combined output for the face 414, and the vertex $V_{14}$, consists, as indicated at the bottom of the figure, of the symbol F3, followed by the symbol V5.

The vertex $V_{14}$ is also placed on the active queue. Moreover, the vertex $V_3$ continues to be designated as the current vertex. The situation is as illustrated in FIG. 5G.

Next, as illustrated in FIG. 4H, the degree of face 416, four, is output in the encoded data stream, followed by the valence of the one unprocessed vertex incident to face 416, $V_{15}$. Vertex $V_{15}$ has a valence of four. The combined output for the face 416, and the vertex $V_{15}$, consists, as indicated at the bottom of the figure, of the symbol F4, followed by the symbol V4.

The vertex $V_{15}$ is also placed on the active queue. Moreover, since the traversal is complete, the vertex $V_3$ is removed from the active queue, and another vertex, $V_4$, is designated as the current vertex. The situation is as illustrated in FIG. 5H.

The ring of vertex $V_4$ is then traversed. This process is illustrated in FIGS. 4I and 4J. In FIG. 4I, face 418 is encountered. In FIG. 4J, face 420 is encountered. Since each of these faces is unprocessed, steps 308 and 310 are performed in relation to each of these faces.

In particular, as illustrated in FIG. 4I, the degree of face 418, four, is output in the encoded data stream, followed by the valences of the two unprocessed vertices incident to face 418, $V_{16}$ and $V_{17}$. Vertex $V_{16}$ has a valence of three, and vertex $V_{17}$ has a valence of four. The combined output for the face 418, and the vertices $V_{16}$ and $V_{17}$, consists, as indicated at the bottom of the figure, of the symbol F4, followed by the symbol V3 and the symbol V4.

The vertices $V_{16}$ and $V_{17}$ are also placed on the active queue. Similarly, prior to the traversal, the vertex $V_4$ is designated as the current vertex. The situation is as illustrated in FIG. 5I. Again, numeral 504 identifies the current vertex, in this case $V_2$, and numeral 502 identifies the contents of the active queue.

Next, as illustrated in FIG. 4J, the degree of face 420, four, is output in the encoded data stream, followed by the valence of the one unprocessed vertex incident to face 420, $V_{18}$. Vertex $V_{18}$ has a valence of five. The combined output for the face 420, and the vertex $V_{18}$, consists, as indicated at the bottom of the figure, of the symbol F4, followed by the symbol V5.

The vertex $V_{18}$ is also placed on the active queue. Since the traversal of vertex $V_4$ is complete, the vertex $V_4$ is removed from the active queue, and the vertex $V_5$ designated as the current vertex. The situation is as illustrated in FIG. 5J.

The ring of vertex $V_5$ is then traversed. This process is illustrated in FIGS. 4K and 4L. In FIG. 4K, face 422 is encountered. In FIG. 4L, face 424 is encountered. Since each of these faces is unprocessed, steps 308 and 310 are performed in relation to each of these faces.

Next, as illustrated in FIG. 4K, the degree of face 422, four, is output in the encoded data stream, followed by the valences of the two unprocessed vertices incident to face 422, $V_{19}$ and $V_{20}$. Vertex $V_{19}$ has a valence of three. Vertex $V_{20}$ has a valence of four. The combined output for the face 422, and the vertices $V_{19}$ and $V_{20}$, consists, as indicated at the bottom of the figure, of the symbol F4, followed by the symbols V3 and V4.

The vertices $V_{19}$ and $V_{20}$ are also placed on the active queue. Moreover, the vertex $V_5$ continues to be designated as the current vertex. The situation is as illustrated in FIG. 5K.

Next, as illustrated in FIG. 4L, the degree of face 424, four, is output in the encoded data stream, followed by the valence of the one unprocessed vertex incident to face 424, $V_{21}$. Vertex $V_{21}$ has a valence of five. The combined output for the face 424, and the vertex $V_{21}$, consists, as indicated at the bottom of the figure, of the symbol F4, followed by the symbol V5.

The vertex $V_{21}$ is also placed on the active queue. Moreover, the vertex $V_5$ continues to be designated as the current vertex. The situation is as illustrated in FIG. 5L. Vertex $V_5$ continues to be designated as the current vertex since the traversal of this vertex has not yet been completed. In particular, the face 426 remains to be processed.

It will be observed from FIGS. 4A–4L that the unprocessed vertices which are encountered and added to the active queue are taken from an ever widening spiral emanating from the seed face. In particular, the vertices are added to the active queue in the order in the following order, which is the order in which they are encountered: $V_1, V_2, V_3, V_4, V_5, V_6, V_7, V_8, V_9, V_{10}, V_{11}, V_{12}, V_{13}, V_{14}, V_{15}, V_{16}, V_{17}, V_{18}, V_{19}, V_{20}$, and $V_{21}$.

Figure 6B:
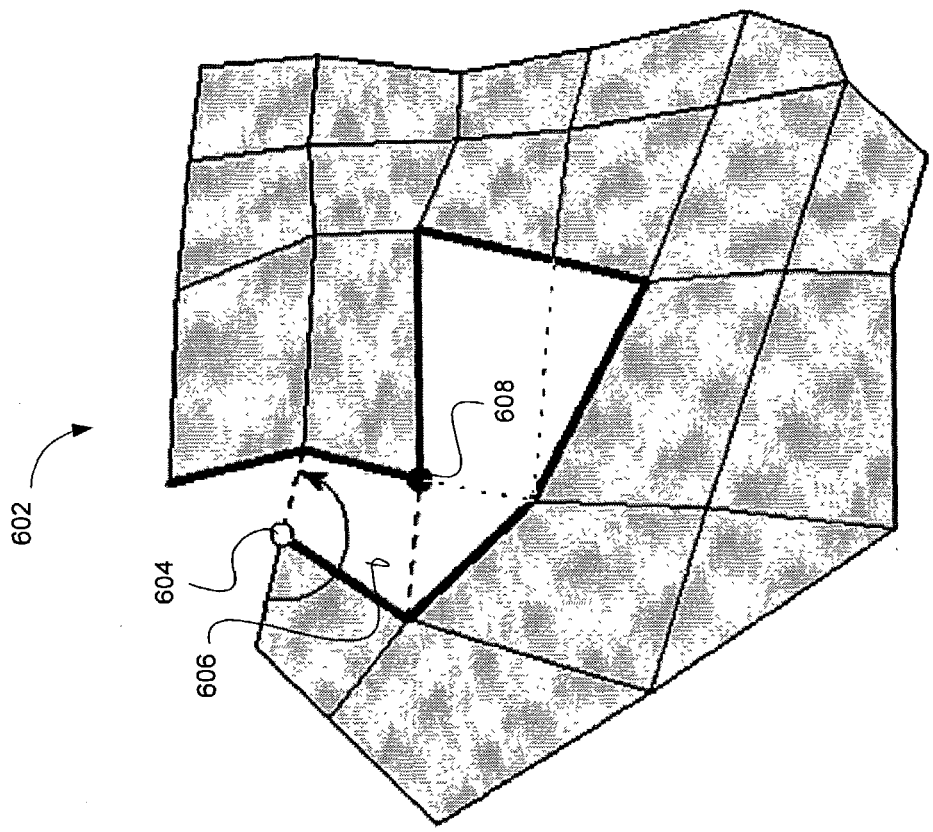
FIGS. 6A–6B illustrates an example of a split vertex.
Figure 6A:
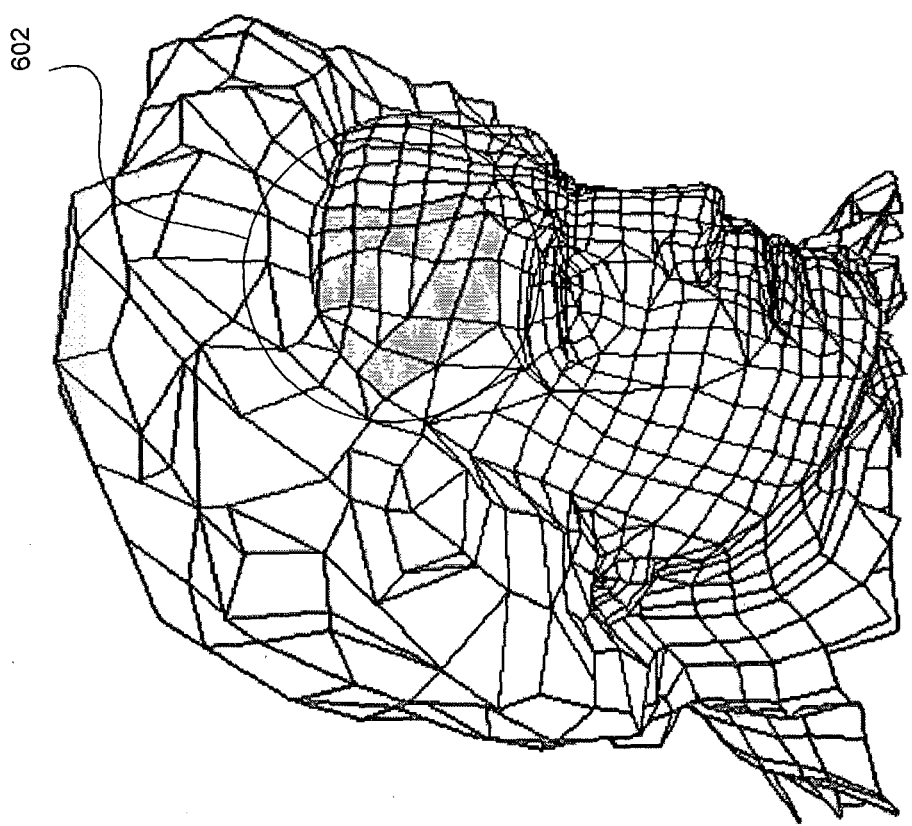

Yet, there are certain situations where one of these vertices, when encountered in an encoding process originating at a particular seed face, has already been processed in a manner originating independently of the seed face. Consider, for example, the portion 602 of the mesh representation illustrated in FIG. 6A, which is shown in greater detail in FIG. 6B. As shown in FIG. 6B, during the traversal of vertex 604, unprocessed face 606 is encountered. Normally, vertex 608 would be expected to be unprocessed when encountered, but, in this particular case, it has already been processed.

If the encoder were to simply output the valence of this vertex in the encoder output stream, the decoder, when encountering this information, would naturally assume that the vertex has not yet been processed, and would erroneously create a new data structure representative of this process. That would cause confusion since a data structure for the vertex has already been created.

To avoid this problem, in one embodiment, the encoder undertakes a special process when such a vertex is encountered. According to this specialized process, such a vertex is designated as a split symbol, since the vertex splits the boundary between processed and unprocessed regions into disconnected components. When such a vertex is encountered, in lieu of outputting the valence of the vertex, a split symbol S is output in the encoding stream, followed by an index or pointer to the location in the active queue where the vertex already appears. In addition, in one implementation, the index of or pointer to the current face in the ring of the split vertex is also output to fully specify the split. Thus, for the split vertex 608 illustrated in FIG. 6B, the symbol S is output, followed by an index to the vertex 608, and an index to the face 606. The manner in which the decoder handles this symbol will be discussed subsequently.

Figure 9B:
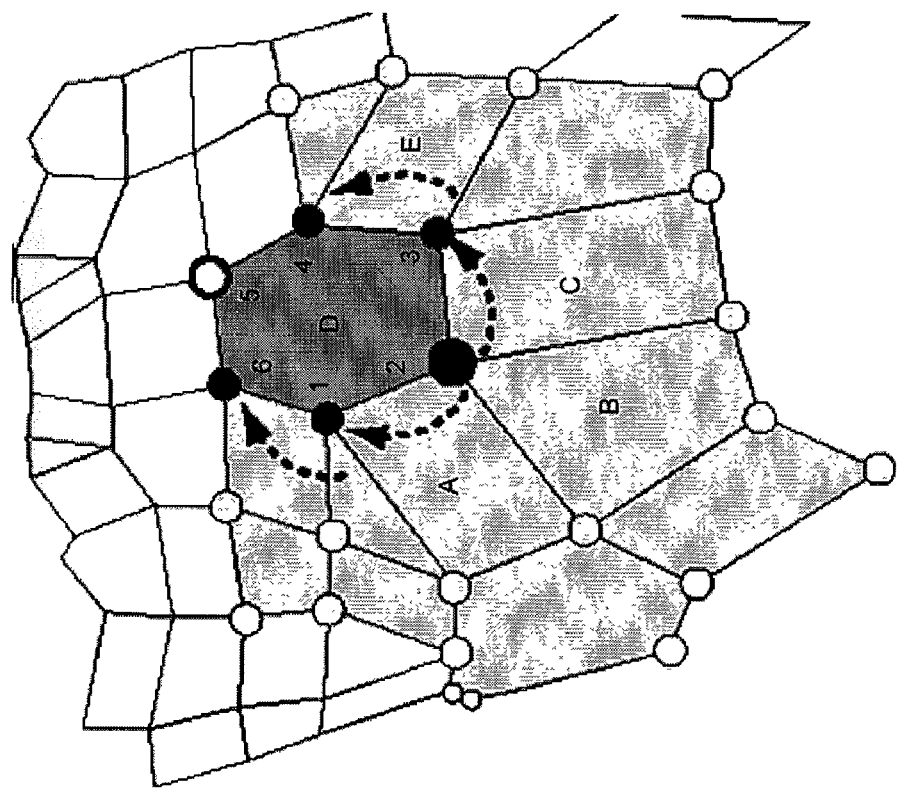
FIGS. 9A–9B illustrate an embodiment of a process of determining whether a vertex was previously visited without generating a split.
Figure 9A:
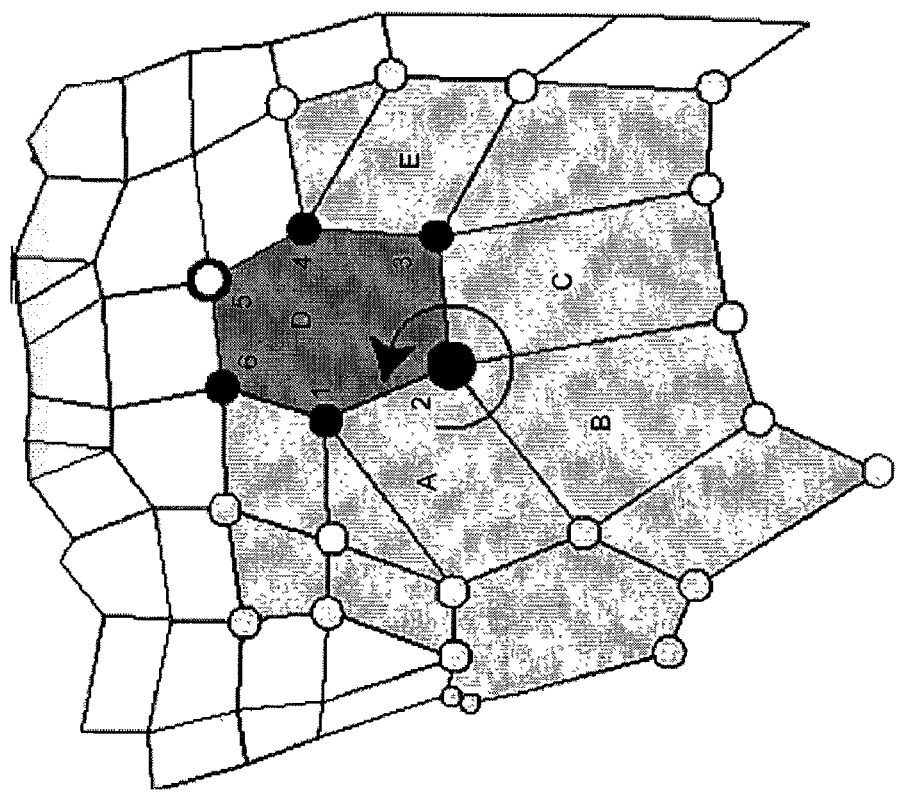

FIGS. 9A–9B illustrate a process, which may be employed by the encoder or the decoder, of determining whether a vertex was previously visited without generating a split. In FIG. 9A, all but the vertex 5 is assumed to have been previously visited, denoted by the fact that they belong to the gray area.

It is known that vertex 2 was previously visited since it is the current vertex. Vertex 3 is also known to have been visited since it is shared by faces C and D, and face C is known to have already been completely processed.

FIG. 9B illustrate the process of successively determining the status of vertices 3, 4, 1, and 6. In particular, the figure shows the particular case when D is the last face in the ring around vertex 3. Therefore, vertices 3 and 4 is determined to have been visited since the face E which is adjacent to D and across the edge 3-4 was previously processed. Similarly, D is the last face in the ring of vertex 2. Therefore, vertex 1 is determined to have been visited, and D is the last face in the ring for vertex 1. Therefore, the vertex 6 is also determined to have been visited.

A check of vertex 5, however, is ambiguous. More specifically, since the traversal of both vertex 6 and vertex 4 is uncompleted, no information can be deduced about vertex 5. It can either be unprocessed or it can be a split vertex; therefore, it requires a valence or a split symbol to be sent by the encoder and received by the decoder.

Figure 7:
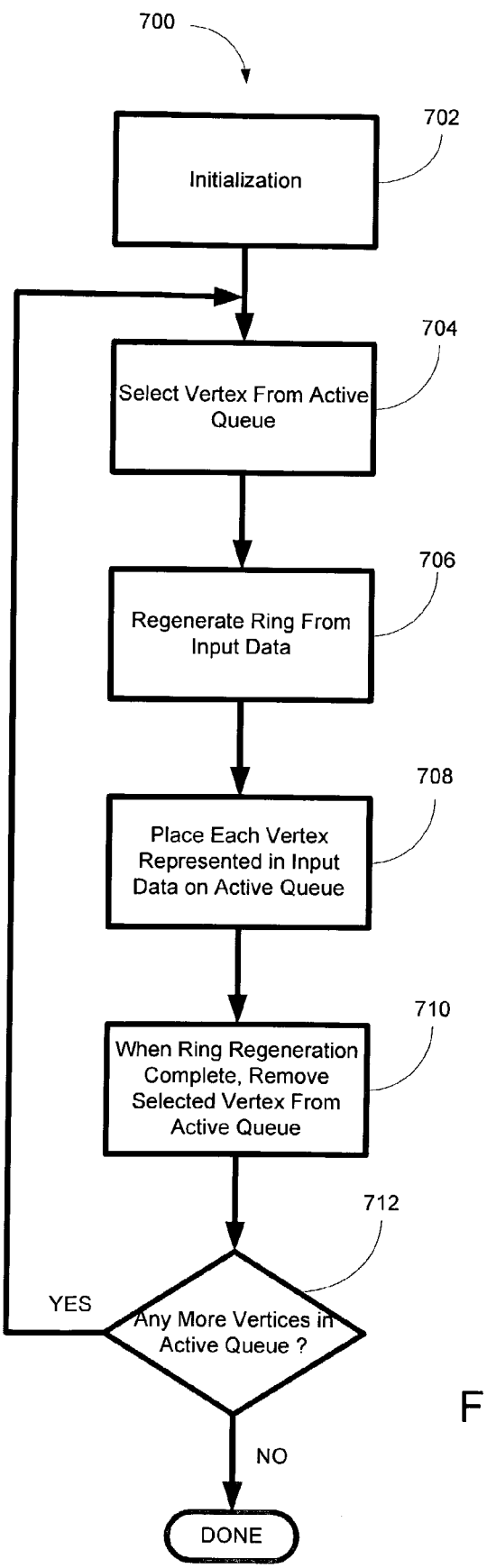
FIG. 7 is a flow diagram illustrating an embodiment of a method of decoding encoded connectivity information for a mesh representation of an object.

In one embodiment, the encoder outputs an encoded data stream which comprises two logical streams, one for the face-degree information, and the other for the vertex-valence information. In one implementation, each of these logical streams is entropy encoded with different contexts. In one example, each of these stream is encoded with multiple, different contexts. In one configuration, these contexts depend on the valence and degree of previously encountered vertices and faces. FIG. 7 is a flow diagram illustrating one embodiment 700 of a method of decoding connectivity encoding information for a polygonal mesh representation of an object such as generated through performance of the method of FIG. 3.

Note that this decoding method closely parallels the encoding method illustrated in FIGS. 3, 4, and 5 since the decoder basically repeats the functions performed by the encoder. Consequently, the discussion herein relating to the decoder and FIG. 7 directly pertains to the discussion of the encoder, and the discussion herein relating to the encoder and FIGS. 3, 4, and 5 directly pertains to the discussion of the decoder. Similarly, the pseudo-code of FIGS. 11A–11B applies to both the encoder and decoder.

As illustrated, in this particular embodiment, the method begins with initialization step 702. In this initialization step, an encoder data stream is read, and one or more vertices represented by the data are entered on the active vertex queue. In one implementation, this step further comprises reading data representative of the connectivity of a seed face, and creating there-from a data structure representative of the seed face connectivity. It also includes reading in data representative of the connectivity of the vertices of the seed face, and creating data structures there-from representative of the connectivity of each of these vertices.

As discussed previously, in one embodiment, the encoded data stream comprises two logical streams, one for the face degree information, and the other for the vertex valence information. Each of these streams may be entropy encoded with different contexts. In one implementation, each stream is entropy encoded with multiple, different contexts.

In one implementation example, the data structure for a face includes pointers to each of the vertices incident to the face, with the pointers being maintained in a prescribed order, and the data structure for a vertex includes pointers to each of the faces incident to the vertex, with the pointers again being maintained in the prescribed order.

Figure 8B:
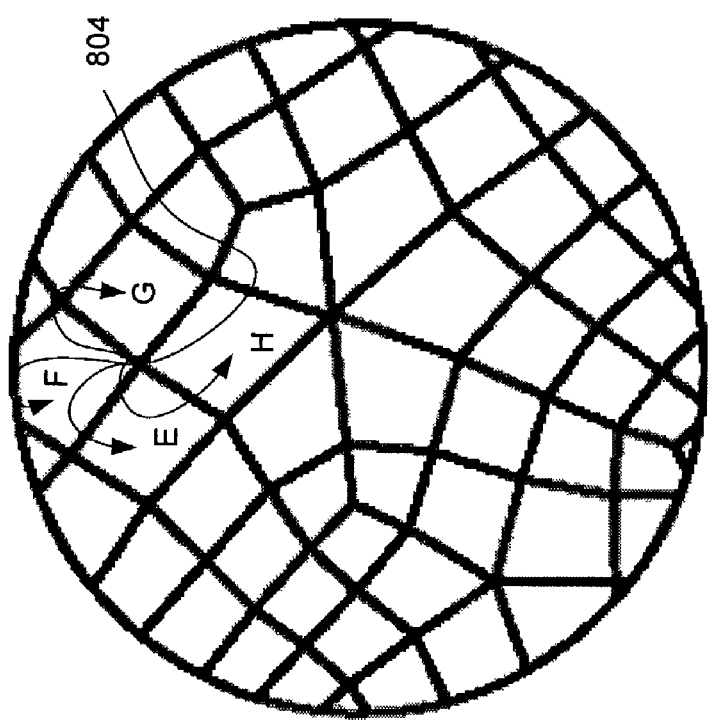
FIGS. 8A–8B respectively illustrate data structures representing the connectivity of a face and a vertex.
Figure 8A:
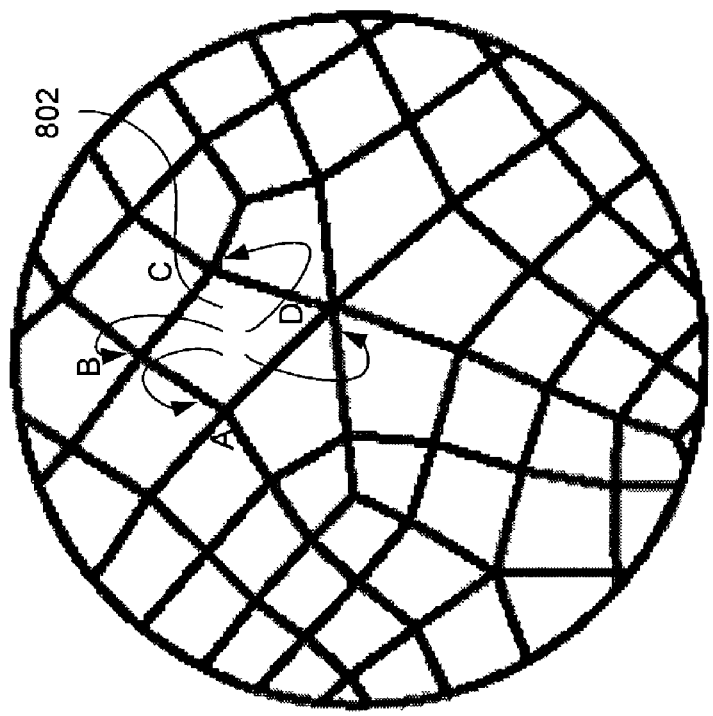

FIG. 8A illustrates a data structure representative of the connectivity of face 802. As illustrated, the data structure includes pointers to each of the vertices incident to this face, identified respectively with the letters A, B, C, D. The pointers are maintained in a prescribed order, which, in this example, is the counter-clockwise order A, B, C, D.

FIG. 8B illustrates a data structure representative of the connectivity of vertex 804. As illustrated, the data structure includes pointers to each of the faces incident the vertex, identified respectively with the letters E, F, G, H. The pointers are maintained in a prescribed order, which, in this example, is the counter-clockwise order E, F, G, H.

In this implementation example, the face is linked to each of its incident vertices by adding to the data structure for the face a pointer to the data structure for each of the incident vertices. Similarly, the vertices are each linked to the face by adding to the data structure for the vertex a pointer to the data structure for the face. In addition, each of the vertices incident to the seed face is added to the active queue.

Step 704 follows step 702. In step 704, a vertex is selected from the active queue. In one implementation, this vertex may be referred to as the current vertex. In one example, the vertex is selected using the same policy or heuristic as employed at the encoder for this purpose, although it should be appreciated that examples are possible where the two differ.

Step 706 follows step 704. In step 706, data representative of the connectivity of the ring of the selected vertex is read, and data structures representative of the connectivity of any unprocessed faces and vertices within this ring created. In addition, the data structure for a face is linked to each of the vertices incident thereto. Similarly, the data structure for a vertex is linked to each of the faces incident thereto. In one embodiment, this step is performed for both dummy and regular faces.

If a split vertex is encountered, a new data structure for the vertex is not created. Instead, the previously created data structure for the vertex is accessed and linked to unprocessed face within the ring which is incident to this vertex.

Step 708 follows step 706. In step 708, each unprocessed non-split vertex in the ring is placed in the active queue. From step 708, the method proceeds to step 710. In step 710, after the regeneration of the ring has been completed, the current vertex is removed from the active queue.

Step 714 follows step 712. In step 714, an inquiry is made whether there any vertices remaining on the active queue. If so, the method loops back to step 704 for another iteration. If not, the method completes. In one embodiment, the data structures for the dummy faces are discarded at the conclusion of the decoding process.

In one embodiment, if the active queue is empty but the encoded data stream is not, it is determined that additional mesh components in the encoded stream remain to be processed. Accordingly, in this embodiment, the method iterates back to step 702 one or more times for processing of the additional components.

One implementation of the process of regenerating a face within the ring of a vertex will now be described. In particular, a face is "encountered" in the data stream when the degree of the face is read. For example, the symbol F6 signifies that the corresponding face has a degree of six. When this symbol is read, a data structure for this face is created. The data structure is created with six slots, with the number of slots equal to the degree of the face. Pointers to the data structures for processed vertices are added to the appropriate slots within the data structure for the face.

The slots corresponding to unprocessed vertices are left blank for the moment since these vertices have not yet been encountered in the data stream. Also, a pointer to the data structure for the face is added to the appropriate slot within the data structure for the processed vertices.

A vertex is encountered when the valence of the vertex is read. For example, the symbol V4 indicates that the vertex has a valence of four. When this symbol is read, a data structure for this vertex is created with four slots, with the number of slots equal to the valence of the vertex. Then, a pointer to this data structure is added to the appropriate slot in the data structure for the face. Similarly, a pointer to the data structure for the face is added to the appropriate slot in the data structure for the vertex.

An encoding system for connectivity encoding a polygonal mesh representation according to the invention is illustrated in FIG. 10A. As illustrated, the system comprises a memory 1004 holding software instructions embodying the method of FIG. 3, or any of the embodiments, implementations, or examples thereof which have been discussed or suggested. The system also comprises processor 1002 which is configured to access and execute the software instructions held by the memory 1004. As indicated, the input to the system is a polygonal mesh representation, and the output of the system is one or more encoded data streams.

A decoding system for decoding encoded connectivity information for a polygonal mesh representation according to the invention is illustrated in FIG. 10B. As illustrated, the system comprises memory 1008 holding software instructions embodying the method of FIG. 7, or any of the embodiments, implementations, or examples thereof which have been discussed or suggested. The system also comprises processor 1006 which is configured to access and execute the software instructions held by the memory 1008. As indicated, the input the system is one or more encoded data streams, such as produced by the system of FIG. 10A, after passage through a communications channel, storage in a memory, or some other processing or transmitting step. The output of the system is regenerated connectivity information for the polygonal mesh representation.

An encoder or encoding system according to the invention is also possible which comprises logic for performing the method of FIG. 3, or any of the embodiments, implementations, or examples thereof which have been discussed or suggested. Similarly, a decoder or decoding system according to the invention is possible which comprises logic for performing the method of FIG. 7, or any of the embodiments, implementations, or examples thereof which have been discussed or suggested.

Compared to the generalized algorithms discussed at the outset, it has been found that embodiments of the invention achieve an average improvement in compression ratio of about 20%. Compared to the specialized triangle-oriented algorithms discussed at the outset, it has also been found that embodiments of the invention, when applied to triangle meshes, achieves an improvement in compression ratio.

EXAMPLE

In one example, an encoding system or encoder according to the invention outputs two logical data streams, one for the face degrees, and the other for the vertex valences. Fifteen symbols are defined for the face degree encoded data stream, and 16 symbols are defined for the vertex valence encoded data stream. The symbols "3"–"15" correspond to actual valences or degrees. The symbol "2" represents valence 2 in the vertex valence stream and "B" (for boundary) in the face degree stream to mark dummy faces and distinguish them from regular faces. The symbol "1" is an ESC (escape) symbol for encoding valences or degrees larger than 15. The symbol "0" is the Split symbol code in the vertex valence stream, and is not used in the face degree stream.

In another example, the encoder is an entropy encoder, such as but not limited to a content-based arithmetic coder, which encodes the two streams. Each stream has its own set of context tables. The encoder may provide only a single context table per stream. Such an approach might be appropriate if the mesh is small, or the encoding stream has a very regular symbol pattern. Alternatively, the encoder may provide multiple context tables per stream. In general, higher compression ratios are achieved with multiple contexts for each stream.

If the case where only a single context table per stream is used, the context table can be stored in the header of a file containing the encoded stream. In the case where multiple contexts per stream are used, it may be too expensive to save exact tables. In this case, only summary information is stored. An adaptive arithmetic coder is then used to fully restore or update the tables.

Pseudo-code embodying one implementation of a vertex traversal algorithm for use in the encoder is illustrated in FIGS. 11A–11C. This pseudo-code may, with suitable modification of the functions listed in FIG. 11A, be used in the decoder as well.

While various embodiments of the invention have been described, it will be apparent to those of ordinary skill in the art that many more embodiments and implementations are possible that are within the scope of this invention.

What is claimed is:

1. A method of connectivity encoding a polygonal mesh representation of an object comprising the steps of:
    initializing a queue with one or more unprocessed vertices from the polygonal mesh representation;
    selecting a vertex from the queue, the vertex having a ring;
    traversing the ring of the vertex;
    for each unprocessed face encountered in the traversing step, the face having a degree, outputting the degree of the face and the valence of any unprocessed vertex incident to the face;
    placing each unprocessed vertex encountered in the previous step in the queue;
    removing the selected vertex from the queue when the traversal has been completed; and
    performing one or more additional iterations of the method beginning with the selecting step if any vertices remain on the queue,
    wherein the initializing step further comprises selecting a seed face, and outputting the degree of the seed face, followed by the valences of vertices incident to the face.

2. A computer program product tangibly embodied on a computer-readable medium embodying the method of claim 1.

3. A system comprising a processor and the computer program product of claim 2, wherein the processor is configured to access and execute the computer program product.

4. The method of claim 1 further comprising outputting two logical streams comprising a face degree stream and a vertex valence stream.

5. The method of claim 4, wherein each stream is entropy encoded with different contexts.

6. The method of claim 5 wherein each stream is entropy encoded with multiple, different contexts.

7. A method of decoding encoded connectivity information for a polygonal mesh representation of an object comprising the steps of:
    reading input data representative of the connectivity of one or more vertices of the mesh representation, and initializing a queue with the one or more vertices;
    selecting a vertex from the queue, the vertex having a ring;
    reading input data representative of the connectivity of any unprocessed faces incident to the vertex, and any unprocessed vertices incident to the faces, and regenerating the connectivity of the ring of the vertex from this data;

removing the selected vertex from the queue when the ring has been regenerated; and performing one or more additional iterations of the method beginning with the selecting step if any vertices remain on the queue, wherein the initializing step further comprises reading data representative of the connectivity of a seed face and the vertices incident thereto, and regenerating there-from the connectivity of the seed face and its incident vertices.

8. The method of claim 7, wherein the input data comprises multiple, logical streams.

9. The method of claim 8, wherein each stream is decoded with different contexts.

10. The method of claim 9 wherein each stream is decoded with multiple, different contexts.

11. A computer program product tangibly embodied on a computer-readable medium embodying the method of claim 7.

12. A system comprising a processor and the computer program product of claim 11, wherein the processor is configured to access and execute the computer program product.

13. A method of connectivity encoding a polygonal mesh representation of an object comprising the steps of:

a step for initializing a queue with one or more unprocessed vertices from the polygonal mesh representation;

a step for selecting a vertex from the queue, the vertex having a ring;

a step for traversing the ring of the vertex;

a step for outputting the degree of the face and the valence of any unprocessed vertex incident to the face for each unprocessed face encountered in the traversing step;

a step for placing each unprocessed vertex encountered in the previous step in the queue;

a step for removing the selected vertex from the queue when the traversal has been completed; and a step for performing one or more additional iterations of the method beginning with the selecting step if any vertices remain on the queue, wherein the step for initializing a queue further comprises selecting a seed face, and outputting the degree of the seed face, followed by the valences of vertices incident to the face.

14. A method of decoding encoded connectivity information for a polygonal mesh representation of an object comprising the steps of:

a step for reading input data representative of the connectivity of one or more vertices of the mesh representation, and initializing a queue with the one or more vertices;

a step for selecting a vertex from the queue, the vertex having a ring;

a step for reading input data representative of the connectivity of any unprocessed faces incident to the vertex, and any unprocessed vertices incident to the faces, and regenerating the connectivity of the ring of the vertex from this data;

a step for removing the selected vertex from the queue when the ring has been regenerated; and a step for performing one or more additional iterations of the method a step for beginning with the selecting step if any vertices remain on the queue, wherein the initializing step further comprises reading data representative of the connectivity of a seed face and the vertices incident thereto, and regenerating there-from the connectivity of the seed face and its incident vertices.

* * * * *